(12) United States Patent
Jones

(10) Patent No.: US 8,337,312 B1
(45) Date of Patent: Dec. 25, 2012

(54) METHODS AND APPARATUS FOR INCREASING ENJOYMENT AND/OR REALISM IN VIDEO GAMES BY INTRODUCING ONE OR MORE REALITY TV SHOW FEATURES

(76) Inventor: David A Jones, Salt Lake City, UT (US)

( * ) Notice: Subject to any disclaimer, the term of this patent is extended or adjusted under 35 U.S.C. 154(b) by 0 days.

(21) Appl. No.: 13/164,606

(22) Filed: Jun. 20, 2011

(51) Int. Cl.
*A63F 9/24* (2006.01)
*A63F 13/00* (2006.01)

(52) U.S. Cl. .................. 463/42; 463/8; 463/31; 700/91

(58) Field of Classification Search .................. 463/1, 4, 463/7–9, 30–32, 40–42; 700/91–93
See application file for complete search history.

(56) References Cited

U.S. PATENT DOCUMENTS

| | | | |
|---|---|---|---|
| 5,860,862 A * | 1/1999 | Junkin | 463/40 |
| 5,890,963 A * | 4/1999 | Yen | 463/42 |
| 6,439,997 B1 * | 8/2002 | Brasseur et al. | 463/40 |
| 2002/0086733 A1 * | 7/2002 | Wang | 463/42 |
| 2004/0067788 A1 * | 4/2004 | Angelopoulos | 463/1 |
| 2005/0137728 A1 * | 6/2005 | Guagliardo | 700/91 |
| 2007/0026946 A1 * | 2/2007 | Newborn | 463/42 |
| 2007/0207846 A1 * | 9/2007 | Burak et al. | 463/9 |
| 2008/0161113 A1 * | 7/2008 | Hansen et al. | 463/42 |
| 2010/0029352 A1 * | 2/2010 | Angelopoulos | 463/4 |
| 2010/0137045 A2 * | 6/2010 | Angelopoulos | 463/1 |
| 2011/0111815 A1 * | 5/2011 | Sediq | 463/8 |
| 2012/0129610 A1 * | 5/2012 | Mazursky et al. | 463/42 |

* cited by examiner

*Primary Examiner* — Milap Shah (57) ABSTRACT

Embodiments disclosed herein related to video games, methods, and apparatus for providing a video game including a reality television show feature. The video game can include video game characters who represent real-life athletes in the video game. The real-life athletes can also be part of a real-life reality television show upon which the reality television show feature of the video game is based.

14 Claims, 4 Drawing Sheets

METHODS AND APPARATUS FOR INCREASING ENJOYMENT AND/OR REALISM IN VIDEO GAMES BY INTRODUCING ONE OR MORE REALITY TV SHOW FEATURES

CROSS-REFERENCE TO RELATED APPLICATIONS

This application is related to U.S. Provisional Patent Application 61/352,059 filed on Jun. 7, 2010, the contents of which are hereby incorporated by reference herein.

BACKGROUND OF THE INVENTION

Mixed martial arts (MMA) is a full contact combat sport that allows a wide variety of fighting techniques and skills, from a mixture of martial arts traditions and non-traditions, to be used in competitions. The rules allow the use of both striking as well as grappling techniques, both while standing and on the ground. Such competitions allow martial artists of different backgrounds to compete.

The ULTIMATE FIGHTING CHAMPIONSHIP (UFC) is a mixed martial arts (MMA) promotion company based in the United States that hosts numerous events worldwide. It is the most successful MMA promotion in the world with many of the sport's top fighters under contract. The UFC has five weight-divisions and enforces the Unified Rules of Mixed Martial Arts. Dana White serves as the president of the UFC; Frank and Lorenzo Fertitta control its parent company, ZUFFA, LLC.

Inspired by vale tudo tournaments in Brazil, the UFC and the sport of MMA have roots in the ancient Olympic combat sport of Pankration in 648 B.C. The UFC held its first competition in Denver, Colo. in 1993. Showcasing fighters of different disciplines—including boxing, Brazilian jiu jitsu, wrestling and Muay That, among others and using any type of martial arts.—the UFC sought to identify the most effective martial art in a real fight. After a period of political backlash, the UFC gradually underwent reform by embracing stricter rules and achieving sanctioning with State Athletic Commissions.

With a cable-television deal and expansion into Canada, Europe, Australia, the Middle East and new markets within the United States, the UFC as of 2010 has gained in popularity, along with greater mainstream-media coverage. As of 2010 viewers can access UFC programming on pay-per-view television, in the United States on SPIKE and VERSUS, in the United Kingdom and Ireland on ESPN, as well as in over 130 countries and 20 different languages worldwide.

Businessman Art Davie met Brazilian Jiu-Jitsu pioneer Rorion Gracie in 1991, while researching martial arts for a marketing client. Gracie operated a Brazilian jiu-jitsu school in Torrance, Calif. and the Gracie family had a long history of vale tudo matches—a precursor of modern mixed martial arts—in Brazil. Davie became Gracie's student.

In 1992, inspired by the Gracies in Action video-series produced by the Gracies and featuring Gracie jiu-jitsu defeating various martial-arts masters, Davie proposed to Rorion Gracie and John Milius an eight-man, single-" tournament with a title of War of the Worlds. The tournament would feature martial artists from different disciplines facing each other in no-holds-barred combat to determine the best martial art. it would aim to replicate the excitement of the matches Davie had seen on the videos. Milius, a noted film director and screenwriter, as well as a Gracie student, agreed to be the event's creative director. Davie drafted the business plan and twenty-eight investors contributed the initial capital to start WOW Promotions with the intent to develop the tournament into a television franchise.

In 1993 WOW PROMOTIONS sought a television partner and approached pay-per-view producers TVKO (HBO), SET (SHOWTIME) and the Semaphore Entertainment Group SEMAPHORE ENTERTAINMENT GROUP (SEG). Both TVKO and SET declined, but SEG—a pioneer in pay-per-view television which had produced such off-beat events as a mixed-gender tennis match between Jimmy Connors and Martina Navratilova—became WOW's partner in May 1993. SEG contacted video and film art-director Jason Cusson to design the trademarked "Octagon", a signature piece for the event. Cusson remained the Production Designer through UFC 27. SEG devised the name for the show as THE ULTIMATE FIGHTING CHAMPIONSHIP.

VHS box art for the first Ultimate Fighting Championship WOW Promotions and SEG produced the first event, later called UFC 1, at McNichols Sports Arena in Denver, Colo. on Nov. 12, 1993. Art Davie functioned as the show's booker and matchmaker. The television broadcast featured kickboxers Patrick Smith and Kevin Rosier, savate fighter Gerard Gordeau, karate expert Zane Frazier, shootfighter Ken Shamrock, sumo wrestler Teila Tuli, boxer Art Jimmerson and 175 lb. Brazilian Jiu-Jitsu black belt Royce Gracie—younger brother of UFC co-founder Rorion Gracie who was hand-picked by Rorion himself to represent his family in the competition. The show became an instant success, drawing 86,592 television subscribers on pay-per-view.

The show proposed to find an answer for sports fans to questions such as: "Can a wrestler beat a boxer?" As with most martial arts at the time, fighters typically had skills in just one discipline and had little experience against opponents with different skills. Royce Gracie's submission skills proved the most effective in the inaugural tournament, earning him the first ever UFC tournament championship.

However, the promoters did not intend for the event to become a precursor to a series. "That show was only supposed to be a one-off," eventual UFC President Dana White said. "It did so well on pay-per-view they decided to do another, and another. Never in a million years did these guys think they were creating a sport."

With no weight classes, fighters often faced significantly larger or taller opponents. For example, Keith "The Giant Killer" Hackney faced Emmanuel Yarborough at UFC 3 with a 9 in (23 cm) height and 400 pounds (180 kg) weight disadvantage. Many martial artists believed that technique could overcome these size disadvantages, and that a skilled fighter could use an opponent's size and strength against him. With the 175 lb (79 kg) Royce Gracie winning three of the first four events, the UFC quickly proved that size does not always determine the outcome of the fight.

During this early stage of the organization, the UFC would showcase a bevy of different styles and fighters. Aside from the aforementioned Royce Gracie, Ken Shamrock and Patrick Smith, the competitions also featured competitors such as Kimo Leopoldo, Hall-of-Famer Dan Severn, Marco Ruas, Oleg Taktarov, Tank Abbott, Don Frye and Gary Goodridge.

In April 1995, following UFC 5 in Charlotte, N.C., Davie and Gracie sold their interest in the franchise to SEG and disbanded WOW Promotions. Davie continued with SEG as the show's booker and matchmaker, as well as the commissioner of Ultimate Fighting, until December 1997.

Although UFC used the "There are no rules!" tagline in the early 1990s, the UFC did in fact operate with limited rules. There was no biting, no eye gouging, and the system frowned on (but allowed) techniques such as hair pulling, headbutting, groin strikes and fish-hooking.

Ken Shamrock, shown training U.S. Marines, was the first reigning UFC Champion to win the title in a non-tournament format. In fact, in a UFC 4 qualifying match, competitors Jason Fairn and Guy Mezger agreed not to pull hair—as they both wore pony tails tied back for the match. Additionally, that same event saw a matchup between Keith Hackney and Joe Son in which Hackney unleashed a series of groin shots against Son while on the ground.

The UFC had a reputation, especially in the early days, as an extremely violent event, as evidenced by a disclaimer in the beginning of the UFC 5 broadcast which warned audiences of the violent nature of the sport.

UFC 5 also introduced the first singles match, called "The Superfight." This was an important development because singles matches would feature fighters who suffered no prior damage from a previous fight in the same event, unlike tournament matches. Singles matches would also become a staple in the UFC for years to come.

"The Superfight" began as a non-tournament match that would determine the first reigning UFC Champion for tournament winners to face; it later evolved into a match that could feature either title matches or non-title matches. The "Superfight" would eventually completely phase out tournament matches; by UFC Brazil, the UFC abandoned the tournament format for an entire card of singles matches (aside from a one time UFC Japan tournament featuring Japanese fighters). UFC 6 was the first event to feature the crowning of the first non-tournament UFC Champion, Ken Shamrock.

After the long battle to secure sanctioning, SEG stood on the brink of bankruptcy when STATION CASINOS executives Frank and Lorenzo Fertitta, and aerobics instructor Dana White approached them in 2001, with an offer to purchase the UFC. A month later, in January 2001, the Fertittas bought the UFC for $2 million and created ZUFFA, LLC as the parent entity controlling the UFC.

With ties to the Nevada State Athletic Commission (Lorenzo Fertitta was a former member of the NSAC), ZUFFA secured sanctioning in Nevada in 2001. Shortly thereafter, the UFC returned to pay-per-view cable television with UFC 33: Victory in Vegas featuring three championship bouts.

The UFC slowly, but steadily, rose in popularity after the ZUFFA purchase, due partly to greater advertising, corporate sponsorship, the return to cable pay-per-view and subsequent home video and DVD releases.

With larger live gates at casino venues like the TRUMP TAJ MAHAL and the MGM GRAND GARDEN ARENA, and pay-per-view buys beginning to return to levels enjoyed by the UFC prior to the political backlash in 1997, the UFC secured its first television deal with FOX SPORTS NET. THE BEST DAMN SPORTS SHOW PERIOD aired the first mixed martial arts match on American cable television in June 2002, as well as the main event showcasing Chuck Liddell vs. Vitor Belfort at UFC 37. Later, FSN would air highlight shows from the UFC, featuring one hour blocks of the UFC's greatest bouts.

At UFC 40, pay-per-view buys hit 150,000 for a card headlined by a grudge match between Tito Ortiz and UFC veteran Ken Shamrock, who had previously defected to professional wrestling in the WWF before returning to MMA. It was the first time the UFC hit such a high mark since being forced "underground" in 1997.

Despite the success, the UFC was still experiencing financial deficits. By 2004, ZUFFA had $34 million of losses since they purchased the UFC. Fighters who came into prominence after ZUFFA's takeover include B. J. Penn, Sean Sherk, Matt Serra, Ricco Rodriguez, Robbie Lawler, Frank Mir, Rich Franklin, Karo Parisyan, Georges St-Pierre and Nick Diaz.

The Ultimate Fighter

Faced with the prospect of folding, the UFC stepped outside the bounds of pay-per-view and made a foray into television. After being featured in a reality television series, AMERICAN CASINO, and seeing how well the series worked as a promotion vehicle, the Fertitta brothers developed the idea of the UFC having its own reality series.

Their idea, THE ULTIMATE FIGHTER (TUF)—a reality television show featuring up-and-coming MMA fighters in competition for a six-figure UFC contract, with fighters eliminated from competition via exhibition mixed martial arts matches—was pitched to several networks, each one rejecting the idea outright. Not until they approached SPIKE TV, with an offer to pay the $10 million production costs themselves, did they find an outlet.

TUF alum Shonie Carter weighs-in for his fight with "The Irish Hand Grenade" Marcus Davis. In January 2005, Spike TV launched TUF in the timeslot following WWE Raw. The show became an instant success, culminating with a notable season finale brawl featuring finalists Forrest Griffin and Stephan Bonnar going toe-to-toe for the right to earn the six-figure contract, an event that Dana White credits for saving the UFC.

On the heels of the Griffin/Bonnar finale, a second season of THE ULTIMATE FIGHTER launched in August 2005, and two more seasons appeared in 2006. SPIKE and the UFC continue to create and air new seasons.

Following the success of THE ULTIMATE FIGHTER, SPIKE also picked up UFC UNLEASHED, an hour-long weekly show featuring select fights from previous events. SPIKE also signed on to broadcast live UFC FIGHT NIGHT, a series of fight events debuting in August 2005; Countdown specials to promote upcoming UFC pay-per-view cards, and several other series and specials featuring and promoting the UFC and its fighters.

With increased visibility, the UFC's pay-per-view buy numbers exploded. UFC 52, the first event after the first season of THE ULTIMATE FIGHTER which featured eventual UFC Hall of Famer Chuck "The Iceman" Liddell avenging his defeat to fellow future Hall of Famer Randy Couture, drew a pay-per-view audience of 300,000, doubling its previous benchmark of 150,000 set at UFC 40. Following the second season of THE ULTIMATE FIGHTER, the UFC's much-hyped rubber match between Liddell and Couture drew an estimated 410,000 pay-perview buys at UFC 57.

For the rest of 2006, pay-per-view buy rates continued to skyrocket, with 620,000 buys for UFC 60: Hughes vs. Gracie—featuring Royce Gracie's first UFC fight in 11 years—and 775,000 buys for UFC 61 featuring the rematch between Ken Shamrock and Tito Ortiz, the coaches of The ULTIMATE FIGHTER 3. The organization hit a milestone with UFC 66, pitting Ortiz against Liddell with over 1 million buys.

The surge in popularity prompted the UFC to beef up its executive team. In March 2006, the UFC announced that it had hired Marc Ratner, former Executive Director of the Nevada Athletic Commission, as Vice President of Regulatory Affairs. Ratner, once an ally of Senator McCain's campaign against no holds barred fighting, became a catalyst for the emergence of sanctioned mixed martial arts in the United States. Ratner continues to educate numerous athletic commissions to help raise the UFC's media profile in an attempt to legalize mixed martial arts in jurisdictions inside and outside the United States that have yet to sanction the sport.

In December 2006, ZUFFA acquired the northern California-based promotion WORLD EXTREME CAGEFIGHTING (WEC) in order to stop the INTERNATIONAL FIGHT LEAGUE (IFL) from making a deal with VERSUS (TV channel). At the time, the UFC had an exclusive deal with SPIKE, so the purchase of the WEC allowed ZUFFA to block the IFL from VERSUS without violating their contract. The WEC showcases lighter weight classes in MMA, whereas the UFC features heavier weight classes. Notable fighters included Urijah Faber, Miguel Angel Tones, Mike Thomas Brown, Brian Bowles and Jose Aldo.

UFC's global expansion has taken it to the UK, as demonstrated in this billboard featuring Spencer Fisher and Sam Stout. The sport's popularity was also noticed by the sports betting community as BodogLife.com, an online gambling site, stated in July 2007 that in 2007 UFC would surpass boxing for the first time in terms of betting revenues. In fact, the UFC had already broken the pay-per-view industry's all-time records for a single year of business, generating over $222,766,000 in revenue in 2006, surpassing both WWE and boxing.

The UFC continued its rapid rise from near obscurity with Roger Huerta gracing the cover of Sports Illustrated and Chuck Liddell on the front of ESPN The Magazine in May 2007.

UFC programming is now shown in 130 countries worldwide, and the UFC plans to continue expanding internationally, running shows regularly in Canada and the U.K., with an office established in the U.K. aimed to expand the European audience. UFC has also held events in Germany, Australia and the United Arab Emirates, while Afghanistan, China, Mexico and the Philippines are candidates for future events.

On Mar. 27, 2007, the UFC and their Japan-based rival the PRIDE FIGHTING CHAMPIONSHIPS announced an agreement in which the majority owners of the UFC, Frank and Lorenzo Fertitta, would purchase the PRIDE brand.

The acquisition of PRIDE was perceived by UFC officials as a watershed moment for mixed martial arts. "This is really going to change the face of MMA," Lorenzo Fertitta declared. "Literally creating a sport that could be as big around the world as football. I liken it somewhat to when the NFC and AFC came together to create the NFL."

Initial intentions were for both organizations to be run separately but aligned together with plans to co-promote cards featuring the champions and top contenders from both organizations. However, Dana White felt that the PRIDE model wasn't sustainable and the organization would likely fold with many former PRIDE fighters such as Antonio Rodrigo Nogueira, Mauricio "Shogun" Rua, Dan Henderson, Wanderlei Silva and others already being realigned under the UFC brand. On Oct. 4, 2007, PRIDE WORLDWIDE closed its Japanese office, laying off 20 people who were working there since the closing of its parent company DREAM STAGE ENTERTAINMENT (DSE).

Quinton "Rampage" Jackson, one of many stars to emerge after the UFC's acquisition of PRIDE and WFA, seen picking up Ricardo Arona for a rare knockout from a body slam at Pride Critical Countdown 2004 In 2008, the UFC announced two major exclusive sponsorship deals with HARLEY-DAVIDSON and ANHEUSER-BUSCH INBEV, making the brewer's BUD LIGHT the official and exclusive beer sponsor of the UFC.

On Jun. 18, 2008, Lorenzo Fertitta accommodated the UFC's growth by announcing his resignation from STATION CASINOS in order to devote his energies to the international business development of ZUFFA, particularly the UFC. The move proved to be pivotal, as Fertitta helped strike TV deals in China, France, Mexico and Germany as well as open alternative revenue streams with a new UFC video game and UFC action figures, among other projects.

Popularity took another major surge in 2009 with UFC 100 and the 10 events preceding it including UFC 90, 91, 92, 94 and 98. UFC 100 was a massive success garnering 1.7 million buys under the drawing power of former NCAA wrestling champion and WWE star Brock Lesnar and his rematch with former Heavyweight champion Frank Mir, Canadian superstar Georges St-Pierre going head-to-head with Brazilian knockout artist Thiago Alves, and Pride legend Dan Henderson going against British middleweight Michael Bisping; rival coaches on THE ULTIMATE FIGHTER: U.S.A. vs U.K.

Fighters exposed to the UFC audience—or who became prominent—in the post-Pride era include Anderson Silva, Lyoto Machida, Antonio Rodrigo Noguiera, Quinton Jackson, Forrest Griffin, Rashad Evans, Dan Henderson, Mauricio Rua, Thiago Silva, Josh Koscheck, Nate Marquardt, Shane Carwin, Cain Velasquez, Kenny Florian, Diego Sanchez, Junior dos Santos, Dan Hardy, Clay Guida, Sam Stout and Frank Edgar, among others.

MMA Video Games

UFC 2009 UNDISPUTED is a mixed martial arts video game featuring ULTIMATE FIGHTING CHAMPIONSHIP properties and fighters developed by Yuke's Osaka and published by THQ. The game was released in the US on May 19, 2009, for the XBOX 360 and PLAYSTATION 3. It is the first game to be released under THQ's 2007 agreement with the UFC, and it is to be the first UFC game released since UFC: SUDDEN IMPACT in 2004. A playable demo of UFC 2009 was released onto Xbox Live and PLAYSTATION NETWORK on Apr. 23, 2009, and featured a tutorial and exhibition matchup between Chuck Liddell and Mauricio Rua.

UFC UNDISPUTED 2010 is a mixed martial arts video game featuring ULTIMATE FIGHTING CHAMPIONSHIP properties and fighters developed by YUKE's and published by THQ. It was released on May 25, 2010, for the XBOX 360, PLAYSTATION 3 and for the first time PLAYSTATION PORTABLE. It is the second game to be released under THQ's 2007 agreement with the UFC and it is a sequel to the successful UFC 2009 UNDISPUTED. A teaser trailer of the game was shown on Dec. 12, 2009 at the 2009 SPIKE VIDEO GAME AWARDS, where UFC 2009 UNDISPUTED was named the Best Individual Sports Game, showing a first look at THE ULTIMATE FIGHTER: HEAVYWEIGHTS contestant Kimbo Slice. The full roster was announced April 27 on GAMESPOT.

In an interview with ESPN, producer Neven Dravinski said that they made so many serious upgrades to the game that he cannot play UFC 2009 UNDISPUTED because the gameplay is so poor compared to UFC UNDISPUTED 2010.

UFC UNDISPUTED 2010 will also include multiple changes from the previous version, including:

Improved controls, including a redesign of clinch and ground grappling, as well as an improved career mode, starting in the WORLD FIGHTING ALLIANCE.

Changes to gameplay including usage of cage walls, TKO (cut and injury) finishes and the introduction of Karate, Greco-Roman wrestling and Sambo fighting styles.

Added MMA brands for clothing as well as the introduction of post-fight attire.

New arenas including GM Place, Centre Bell and The O2

In UNDISPUTED, players use the four face buttons on a controller to execute punches and kicks. Simple movements of the left thumbstick alter what type of strike is thrown, while the top left buttons determine where attacks land as well as their strength. The top right buttons allow players to block strikes.

The right thumbstick controls the clinch and grapple mechanics. Simple flicks let players grab onto an opponent, while combining this with the left trigger executes a takedown attempt. Once on the ground, players perform various right thumbstick motions (quarter- or half-circles) to gain an advantageous position to punish foes with punches or deliver a submission hold.

Developer YUKE'S has tweaked combat slightly inside the Octagon for more balanced battles. New grapple and submission moves have been added to mix up action on the ground. There's more activity against the walls of the cage, so the sides will rattle as players are slammed against it.

Perhaps most notable is a new defense mechanic called the Sway system. When players see a punch coming, they can now quickly dodge away and return with a counter attack. It makes fighting up close a bit more realistic. Last year, there was this back-and-forth where players move forward and back trying to bait an opponent before dashing in and countering. Now, fighters can remain close to an opponent and apply pressure while still evading oncoming strikes.

Players can choose between the expanded roster of over 120 fighters and compete in exhibitions, Title Mode or against other players online. But the real fun stems from creating a fighter and launching his career. After players custom build their fighter in Career Mode—choosing everything from fighting styles to tattoos—they will participate in amateur fights before moving up to the UFC ranks.

Training has been tweaked as well, requiring players to place as much focus on their pre-fight regimens as they do on the actual brawl. Players can improve their Strength, Speed and Cardio abilities through related tasks or engage in Sparring to bolster specific skills such as "Standing Strikes Offense" or "Submission Defense." If players don't spar regularly, their skills will degrade over time.

New to training are the Camp Invites, opportunities for fighters to learn special strikes or submissions. After choosing a camp, players decide which move they want to learn, which is acquired by participating in drills and earning points. Players must perform all these pre-fight tasks while monitoring their fight conditioning and fatigue. However, I didn't notice many consequences for entering a fight overly tired or short on conditioning. My stamina remained relatively normal and my fighter didn't appear to lose energy more quickly. Also, the game could use optional drills for Strength, Speed and Cardio exercises to have greater control over how points are delegated.

On Jun. 1, 2009, ELECTRONIC ARTS announced that an all-new fighting title is in development under the EA Sports brand. EA SPORTS MMA will be available in 2010 on the XBOX 360 and PS3. According to Wikipedia.org, its Website does not reveal any facts about the gameplay or its release date, just one link to sign up for the EA SPORTS newsletter and another that directs people to EA Sport's MMA forum. This game will have many options to create the ultimate MMA experience.

DESCRIPTION OF EMBODIMENTS

The present invention relates to providing video game features and updates in connection with a reality TV show. The reality TV show can include a sport tournament in connection with athlete interaction outside of the sport tournament. The interaction outside of the sport tournament can include a house where the athletes live and interact in preparation for the sports tournament. The sports tournament can be a MMA tournament with matchups of the athletes and such MMA tournament and matchups can be updated over the internet in the video game to provide an up-to-date video game experience, interactive experience, and video game tournament for users of the video game.

In addition, features related to the reality TV show can be provided that are separate, or in addition to, the sports tournament. For example, a "house" feature can be provided where a navigatable virtual environment is provided for users to control a virtual athlete and navigate the virtual environment. For example, the navigatable environment can be a virtual Ultimate Fighter house where the MMA fighters live and the user can control a fighter and interact with other users controlling other fighters in the house. In one embodiment, multiple users can each control the different fighters in a virtual representation of the current Ultimate Fighter reality show and compete in a video game tournament which tracks the real-life Ultimate Fighter reality show. The video game can be updated visually and with video game character performance parameters so that the video game, and reality show feature, more closely simulate the real-life athletes and real-life show format, events, and real-life environment. Examples of apparatus and methods for updating sports video games, providing video game navigatable environments, and advertising as well as other features are disclosed in U.S. patent application Ser. Nos. 11/956,288 and 10/266,795 the contents of which are hereby incorporated by reference herein in their entirety.

Reality television is a genre of television programming that presents purportedly unscripted dramatic or humorous situations, documents actual events, and usually features ordinary people instead of professional actors. The genre has existed in some form or another since the early years of television (primarily with game shows), but has expanded significantly since the series Big Brother first aired in 1999. Programs in the reality television genre are commonly called "reality shows" and often are produced in series. Documentaries and nonfictional programming such as news and sports shows are usually not classified as reality shows.

The genre covers a wide range of programming formats, from game or quiz shows which resemble the frantic, often demeaning shows produced in Japan in the 1980s and 1990s (such as Gaki no tsukai), to surveillance- or voyeurism-focused productions such as Big Brother.

Reality television frequently portrays a modified and highly influenced form of reality, utilizing sensationalism to attract viewers and so to generate advertising profits. Participants are often placed in exotic locations or abnormal situations, such as fighters living together, and are sometimes coached to act in certain scripted ways by off-screen "story editors" or "segment producers," with the portrayal of events and speech manipulated and contrived to create an illusion of reality through editing and other post-production techniques.

MMA, and in particular the UFC, exist and find success in a large part due to the popularity of the reality TV show, The Ultimate Fighter. For example, it was not until the public was allowed to view into the personalities, lives, and interactions of the MMA fighters that the sport was able to gain legitimacy in many ways. Prior to the reality show, The Ultimate Fighter, many people considered the sport human cock fighting and not a legitimate sport. Subsequently, and with its rise to predominance MMA has become the fastest growing sport. But, to this day the reality show, The Ultimate Fighter, remains an integral part of the draw and interest in MMA and the UFC, in particular. Taken one step further, it begs the question as to whether a rival MMA organization could compete with the UFC without a corresponding reality show.

Just in the past year or two both the UFC and EA Sports have released MMA video games in a somewhat heated battle. In particular, both companies have battled to secure athletes and create the most animatedly accurate video game. However, neither company has realized the integral link that the Ultimate Fighter reality show plays in the grand scheme of the MMA sport attraction as disclosed herein. Therefore, what would be advantageous are methods and apparatus for providing reality show based features in a video game.

According to one embodiment, means for providing an Ultimate Fighter feature is provided in conjunction with an MMA video game. Examples of MMA video games include the UFC UNDISPUTED 2010 video game or EA SPORTS' MMA video game. The Ultimate Fighter feature can include an accurate, up to date, and updatable over the internet roster of ULTIMATE FIGHTER reality show video game characters that represent the real-life athletes in the video game. The ULTIMATE FIGHTER, or other associated reality show, feature can include a tournament that tracks the real-life Ultimate Fighter reality show. The user of the video game can control a particular MMA fighter from the Ultimate Fighter or the user can create a new fighter to participate in the simulated Ultimate Fighter video game tournament using a control of a game console, such as a PSIII or other game machine.

The results of the video game tournament can be separate from the real life results of the Ultimate Fighter tournament or the results can at least partially track the results of the real-life Ultimate Fighter tournament. For example, each week the user can be offered to control one or more fighters participating the matchups from that week in the Ultimate Fighter tournament. The user can compete against other users online or over a local network or single gaming console or other game device.

The Ultimate Fighter feature include means for updating the Ultimate Fighter feature with results and performance attributes from the real-life Ultimate Fighter reality show. For example, where a fighter has a particularly hard or easy fight such fights might take a toll or lack of toll on that fighter. Therefore, such attributes can be updated in the Ultimate Fighter feature as well as injuries to fighters and changes in appearance to fighters by downloading executable instructions, data structures representing new real-life attributes of fighters or other aspects of the show, as well as new imagery associated thereto over an Internet connection, WAN, LAN, and from a remote server.

The clothing worn by the fighters can also be updated over the Internet to more closely represent the fighters as they appear in real life. Moreover, paid in-game advertising can be updated on the fighters, such as their virtual clothing, so as to provide paid advertising to the users of the Ultimate Fighter video game.

Activity within the MMA video game can have consequences in the real-life Ultimate Fighter reality show as well. For example, actions of users of the MMA video game, and/or Ultimate Fighter feature can affect selection of fighters, matchups, or disqualifications of fighters in the real life Ultimate Fighter reality show. Actions of user of the MMA video game can also affect events outside of the Ultimate Fighter reality show including matchups at UFC main events, other real-life events, and other real-life fight cards.

Feedback and interaction with the real-life fighters in the Ultimate Fighter can also be facilitated by the MMA video game where users are able to contribute to correspondence with the Ultimate Fighter contestants using pools, chats, or other text, video, email interaction. For example, the user can receive feedback regarding training, products, or other information provided by the MMA athlete which can be provided over the Internet via a server-client arrangement. And, real-life MMA athletes can appear in the virtual environment or video game as virtual characters controlled by the real-life athlete to promote produces or entertain and interact with video game users.

The Ultimate Fighter feature can also be associated with a navigatable environment. For example, the virtual athletes can live in a virtual house and interact in the house as the virtual Ultimate Fighter feature video game reality and real life reality show progress. In one embodiment different users can control each athlete of the Ultimate Fighter reality show video game feature, for example online, and they can pair up for a virtual tournament and navigate a virtual environment similar to that in the show. For example, in the show the athletes live in a house together and complete tasks in addition to the MMA reality show real-life fights in some instances. In such an embodiment the users can complete similar video game tasks and fight each other in the video game so as to see how the virtual tournament progresses in comparison with the real-life tournament. In each instance, the performance attributes of the athletes can be updated on an at least weekly basis or at least daily basis, for example, so that the attributes of the video game athletes more closely resemble those of the real-life athletes in the real-life Ultimate Fighter reality show.

And, where a user selects a video game character fighter from the Ultimate Fighter and that video game character fighter subsequently wins the real-life tournament or the video game tournament and joins the UFC with a real-life contract or simulated video game contract and continues into the other matches that user can be recognized as having selected a successful Ultimate Fighter athlete or progressed a successful video game character athlete and the MMA video game can be modified to assimilate that video game fighter into the mainstream queue of fighters in the video game.

Figure 1:
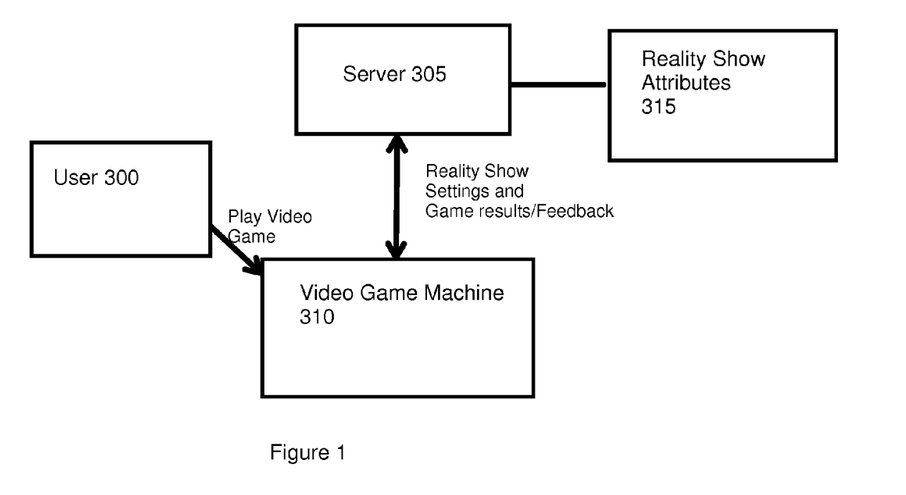
FIG. 1 illustrates a system for providing a sports video game that incorporates a reality show feature.

Examples of Systems and Apparatus for Carrying out the Inventions Disclosed herein FIG. 1 illustrates a system for providing a sports video game that incorporates a reality show feature. According to this embodiment, a user 300 plays a video game hosted by a server 305 and also plays a reality show feature using a video game machine 310, such as a video game console, general purpose or special purpose computer, cell phone, personal digital assistant (PDA), other handheld device, or other electronic device. Most preferably and advantageously, however, the video game machine 310 is a video game console, such as the SONY PLAYSTATION, NINTENDO Wii, or the MICROSOFT XBOX, which are examples of well-known game consoles.

The user 300 receives updates from the server 305 (e.g. via the Internet using a computer. The server 305 (or multiple server(s)) also receives information 315 describing real-life attributes, such as current performance attributes of real-life athletes, real-life MMA camp attributes, real-life environmental attributes, real life appearance attributes, real-life reality show events, real-life reality show tournament results, athlete physical and mental attributes etc. The video game machine 310 downloads information describing at least one setting and/or a video game parameter associated with at least one real-life reality show athlete, environment attribute, or other attribute disclosed herein from the server 305. The video game machine 310 records the information describing the video game parameter and/or the reality show setting for video game play or a navigatable environment; and/or adds, modifies or deletes a video game parameter based on the video game parameter associated with the real-life attribute. The user 300 then competes with the sports video game that uses the parameter associated with the at least one real-life attribute as parameters affecting the sports video game play, reality show feature, and/or otherwise interacts with other users via the navigatable environment.

The server 305 can also make a virtual world and/or advertising available to the user 300 via the video game machine 310 or via a computer as discussed above and in the applications incorporated by reference above.

Figure 2:
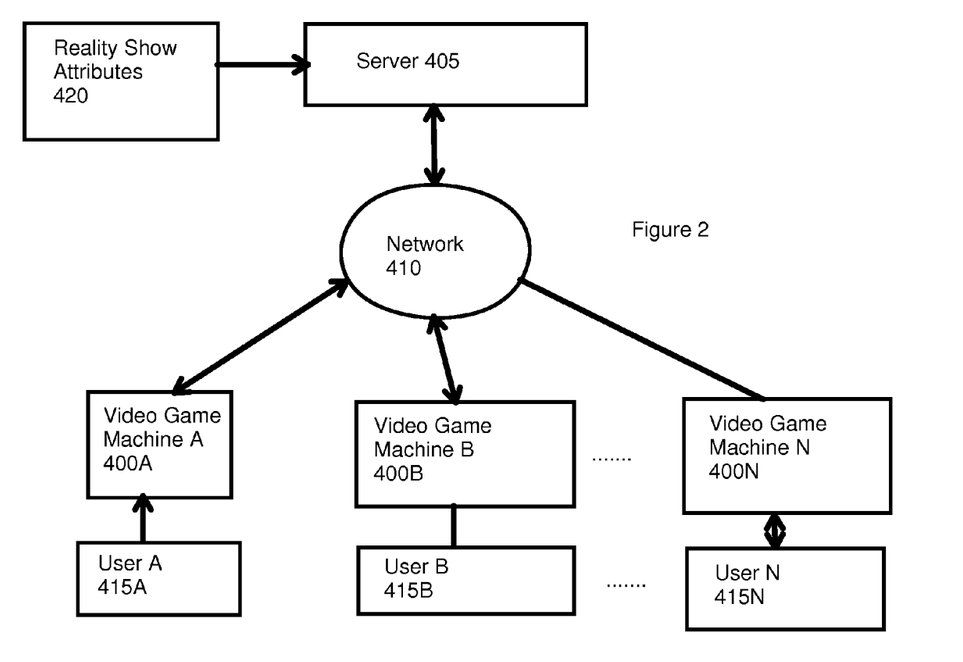
FIG. 2 illustrates a system for providing a sports video game that incorporates various features

FIG. 2 illustrates a system for providing a sports video game that incorporates real-life attributes, virtual identity/virtual world aspects, advertisement, reality TV show features and/or open video game aspects such as feedback or control, supplement, or modify, to the real-life reality TV show based on user input or video game play. The system of FIG. 4 can also enable access to a virtual world and/or advertising to users of video game machines 400A-N. Executable instructions that include initial video game parameters can be stored on a storage medium, such as a video game cd, dvd, cartridge, or can be downloaded via a data transmission link to a tangible non-transitory memory device. The instructions provide the game for play by video game machines 400-A-N. The video game machines 400-A-N can include memory for video game parameter storage. The memory can also store parameters associated with real-life attributes and fantasy settings 420 for affecting the sports video game. The parameters associated with real-life attributes and fantasy settings 420 can be downloaded from a server 405 via a network 410, which may include the Internet. The parameters stored on the memory at the video game machines 400A-N associated with the real-life attributes and fantasy settings 420 can be continuously updated and current real-life attributes and fantasy settings 420 can be updated each time that the video game machines 400A-N log onto the server 405 or according to any other schedule which may be periodic or user defined, for example. The parameters may also be downloaded (e.g. renewed) each time a storage medium containing the sports video game is coupled to the video game machines. Users 415A-N then compete using the video game incorporating the settings and attributes over the network.

Figure 3:
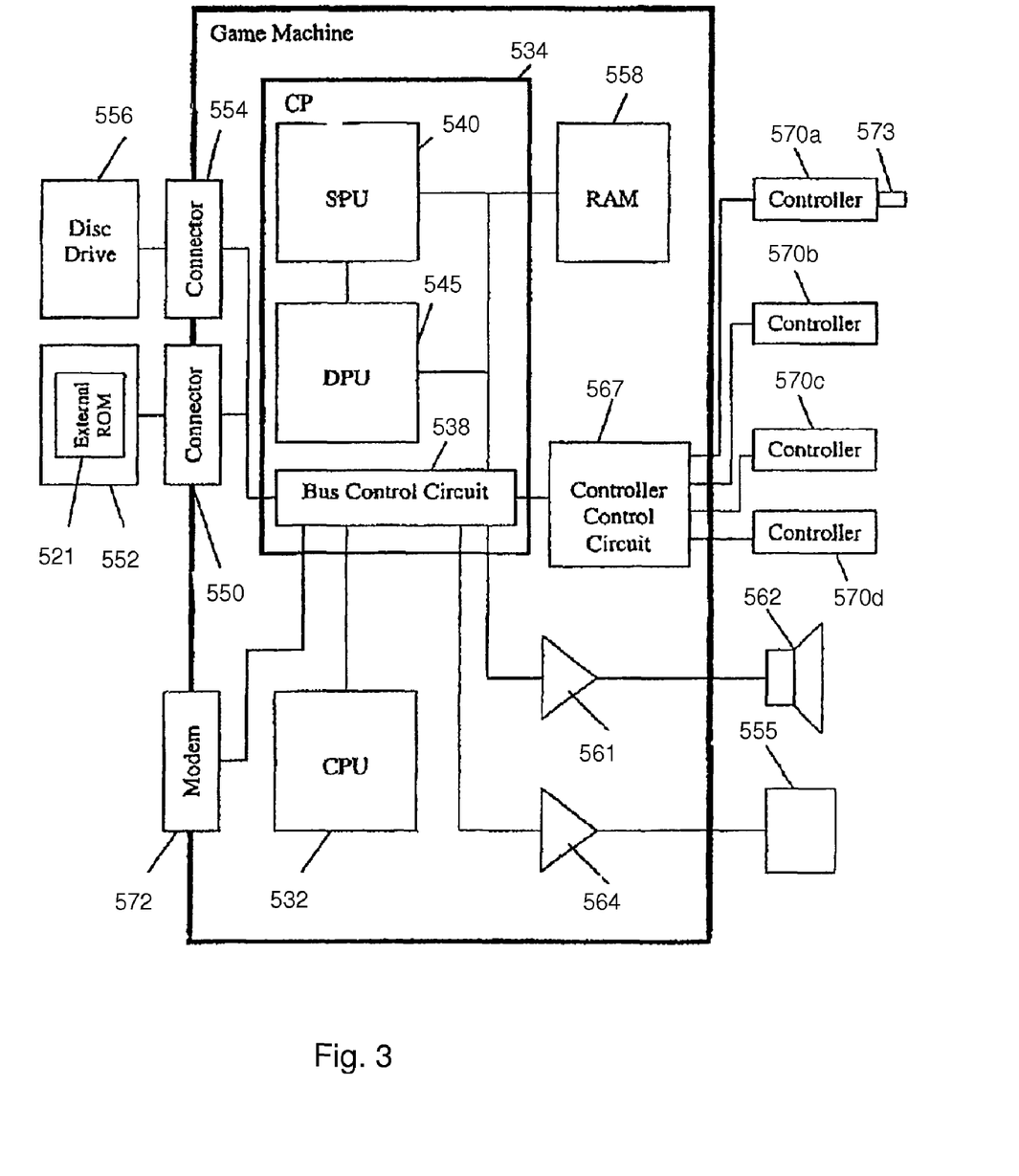
FIG. 3 is a block diagram of an example of a video game machine.

FIG. 3 is a block diagram of an example of a video game machine 520. The video game machine 520 can incorporate a central processing unit (CPU) 532 and coprocessor (CP) 534. The CP 534 can includes a bus control circuit 538 for controlling buses, a signal processing unit (SPU) 540 for performing polygon coordinate transformation, shading treatment, etc., a display processing unit (DPU) 545 for rastorizing polygon data into an image to be displayed and converting the data into a data from (dot data) stored on a memory. The CP 534 is coupled to a cartridge connector 550 for detachably mounting with a ROM cartridge 552, a disc drive connector 554 for detachably mounting with a disc drive 556, and a RAM 558. Also, the CP 534 is connected with an audio signal generating circuit 561 for outputting a sound signal to an audio output device 562, processed by the CPU 532, and an image signal generating circuit 564 for outputting an image signal to a display 565. Further, the CP 534 is coupled with a controller control circuit 567 for serially transferring operational data for one or a plurality of controllers 570A-570D and data for a RAM cartridge 573 for extension.

A modem 572 is coupled to the bus control circuit 538. The modem 572 is also preferably coupled to the internet (not shown) wirelessly or wired. As discussed with reference to FIG. 4, a server coupled to the internet stores real-life attributes and reality show settings, imagery, and parameters. The modem 572 couples to the server and downloads a real-life attribute and a reality show setting for affecting a parameter of play in the video game.

According to an embodiment, the CPU 511 can send a signal through the bus control circuit to initialize the modem 572 and control the modem 572 to download the attribute and setting information from the server. The information can be stored in RAM 558 for affecting a parameter of play of the video game. It will be understood by those of skill in the art that other configurations of video game machines are possible. For example, the CPU 532 and the CP 534, or portions of the CP 534, may be incorporated as one component. Also, for example, RAM 558, may be divided into more than one memory element, or other types of memory elements may be included. The video game machine can also be represented as currently available computers and game consoles. For example, the game machine 520 can be represented by a PLAYSTATION, such as a PLAYSTATION II or III, or a future version of the PLAYSTATION units made by SONY CORPORATION. Other embodiments of the game machine include the XBOX and NINTENDO, such as the NINTENDO Wii. For example, a PLAYSTATION III type console includes a Cell Broadband Engine CPU, a RSX GPU, 256 MB XDR Main RAM 256 MB GDDR3 VRAM, a 2.5" Serial ATA 60 GB IIDD, USB connections, an Ethernet connection, IEEE 802.11b/g WiFi connection, a BLUETOOTH connection, and a wireless BLUETOOTH controller connection supporting up to 7 controllers. Examples of video game machines are further discussed in U.S. Pat. Nos. 6,908,386, 7,019,205, and Publication 2007/0060384, the contents of these two patents and one publication are hereby incorporated by reference herein.

FIGS. 4A-4E are block diagrams of a video game medium 700. The video game medium 700 can include video game instructions 705, video game parameters 710, and image data 715 for the video game. The video game medium can further include video game modification instructions 720 for enabling a video game machine to update the video game with parameters associated with real-life attributes, reality show settings, modifications to the video game via open video game aspects, to provide access to a virtual world hosted by a server connected to the video game machine, and/or to provide access to advertising media.

Parameters stored on the storage medium 700 can include video game character performance parameters 705 for each character of the video game. The video game character performance parameters 705 can be modified based on the reality show and/or real-life parameters downloaded as shown in FIGS. 1 and 2.

Figure 4A:
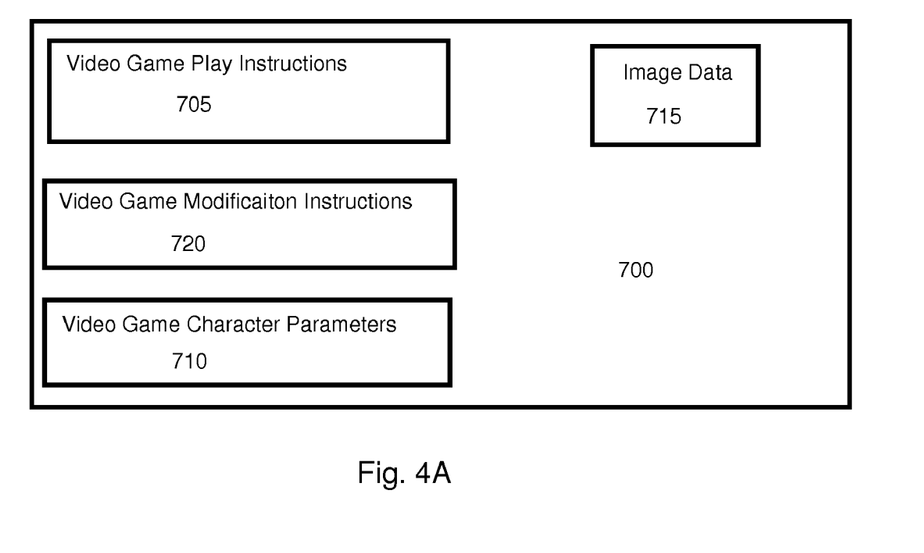
FIGS. 4A-4E are block diagrams of a video game medium.
Figure 4B:
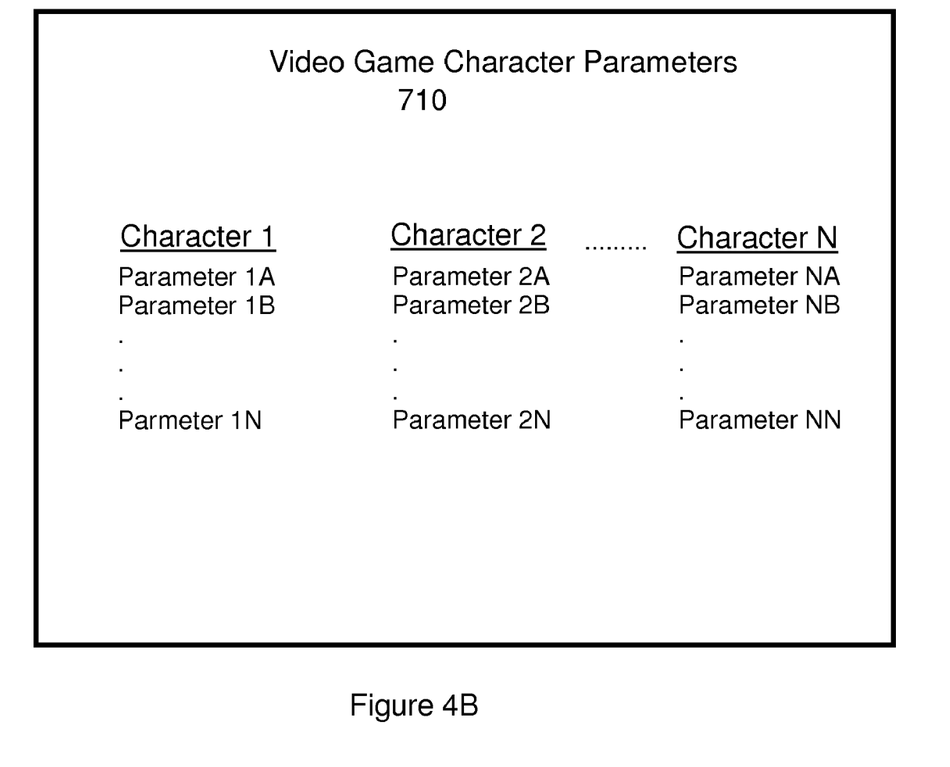
Figure 4C:
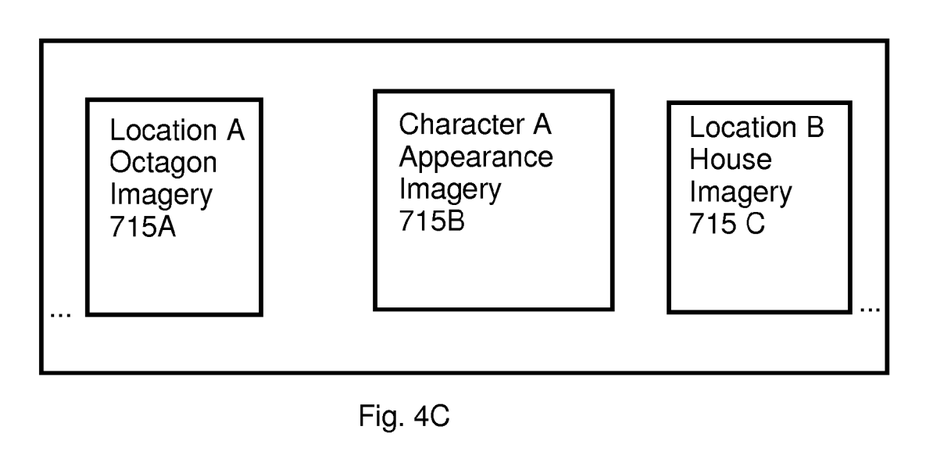
Figure 4D:
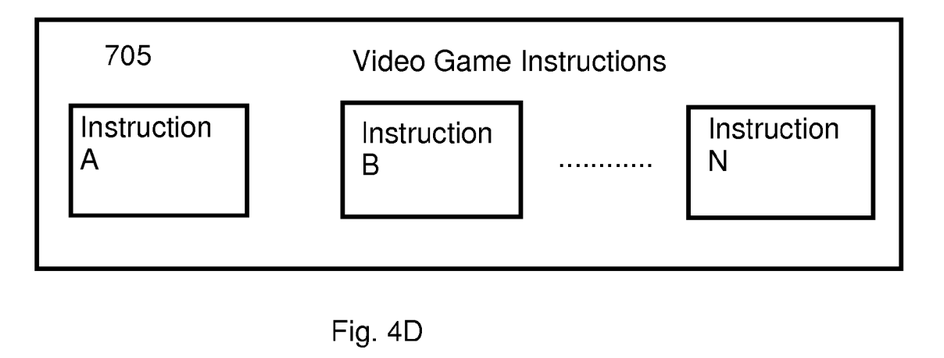

Image data and video game instructions can also be modified as illustrated in FIGS. 4C and 4D. For example, a shown in FIG. 4C weather imagery for location A 715A can be modified, video game character A appearance imagery 715B can be modified, and any imagery related to the appearance of Location A 715C can also be modified. Video game instructions can also be modified such that the manner in which the video game functions, or the manner in which the video game is played, can be modified as disclosed herein.

Figure 4E:
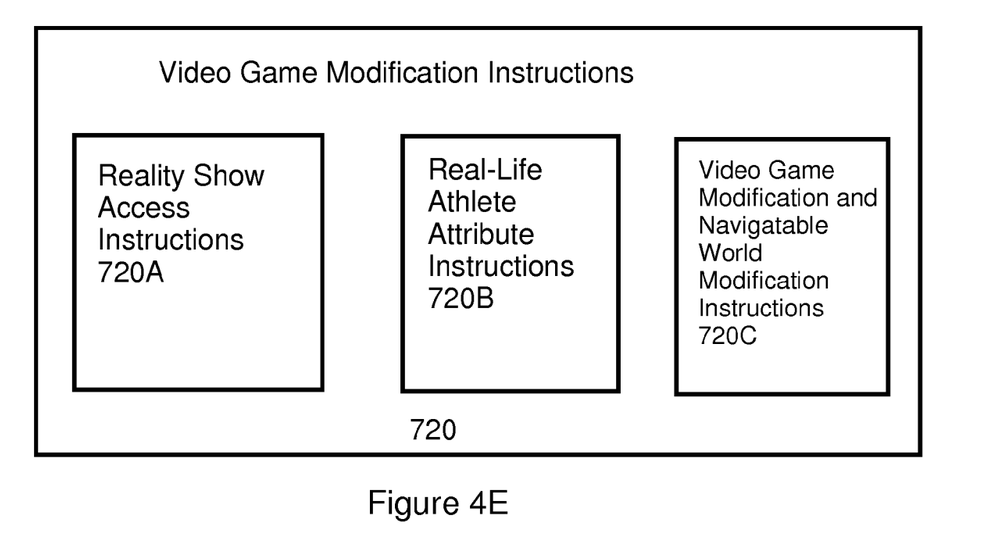

FIG. 4E illustrates an example of the types of video game modification instructions 720 that may be included in a video game product. For example, the video game modification instructions can include instructions for accessing reality show settings 720A, instructions for accessing parameters associated with real-life attributes 720B, and instructions for modifying the video game based on the assessed parameters and reality show settings 720C. The video game modification instructions can also include instructions for accessing advertising media and the virtual world or any of the other actions disclosed herein.

Embodiments within the scope of embodiments illustrated herein can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, several embodiments will be described in the general context of instructions, such as program modules, being executed by computer consoles, computers in network environments. Generally, program modules include routines, programs, objects, components, data structures, etc. that perform particular tasks or implement particular abstract data types. Instructions, associated data structures, and program modules represent examples of the program code means for executing steps of the methods disclosed herein. The particular sequence of such executable instructions or associated data structures represents examples of corresponding acts for implementing the functions described in such steps.

The embodiments illustrated herein may be practiced in network gaming and computing environments with many types of system configurations, including video game machines, such as consoles, personal computers, hand-held devices, multi-processor systems, microprocessor-based or programmable consumer electronics, network PCs, mini-computers, mainframe computers, and the like. Several embodiments may also be practiced in distributed gaming and computing environments where tasks are performed by local and remote processing devices that are linked (either by hardwired links, wireless links, or by a combination of hardwired or wireless links) through a communications network. In a distributed computing environment, program modules may be located in both local and remote memory storage devices, for example in reference to a video game machine.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer-readable game medium configured to provide a sports video game in conjunction with a video game machine, the sports video game having associated video game data comprising at least video game rules, one or more video game character parameters, and one or more video game stadium or field parameters, the computer-readable game medium having instructions stored thereon, which when executed by one or more processors of the video game machine, cause the video game machine to perform the steps of:

loading said video game data stored by the computer-readable game medium into video game machine memory for playing the sports video game, wherein the one or more video game character parameters define respective one or more video game characters, and wherein each of the one or more video game characters are associated with corresponding real-life sports athletes;

loading data associated with a reality television show into the video game machine memory, the real-life athletes being participants in the reality television show; and enabling a user to control the one or more video game characters during playing of the sports video game using a video game controller connected to the video game machine;

wherein, the reality television show is a martial arts reality television show where the real-life sports athletes live together in a house during a real-life competition, the real-life competition progressing as the reality television show progresses; and wherein, said data is periodically updated over the Internet as the martial arts reality show progresses through the real-life competition, thereby affecting at least one of said one or more character parameters and/or said one or more video game stadium or field parameters.

2. A method comprising:

loading video game data stored by a computer-readable game medium into video game machine memory of a video game machine for playing a sports video game, the video game data comprising at least video game rules, one or more video game character parameters, and one or more video game stadium or field parameters, wherein the one or more video game character parameters define one or more video game characters that are each associated with corresponding real-life sports athletes;

loading data associated with a reality television show into the video game machine memory, the real-life athletes being participants in the reality television show; and enabling a user to control the one or more video game characters during playing of the sports video game using a video game controller connected to the video game machine;

wherein, the reality television show is a martial arts reality television show where the real-life sports athletes live together in a house during a real-life competition, the real-life competition progressing as the reality television show progresses; and wherein, said data is periodically updated over the Internet as the martial arts reality show progresses through the real-life competition, thereby affecting at least one of said one or more character parameters and/or said one or more video game stadium or field parameters.

3. A method according to claim 2, wherein the sports video game is a mixed martial arts (MMA) related video game and the martial arts reality television show includes MMA bouts.

4. A method according to claim 2, wherein the sports video game includes a corresponding house feature.

5. A method according to claim 4, wherein the house feature includes a navigable virtual environment provided for a user to control one of the one or more video game characters and navigate the virtual environment.

6. A method according to claim 5, wherein the user uses said one of the one or more video game characters to interact with additional video game characters controlled by other users in the navigable virtual environment.

7. A method according to claim 2, wherein the video game machine includes a video game console.

8. A method according to claim 2, further comprising downloading over the internet and updating imagery of the sports video game related to an appearance of a video game character.

9. A method according to claim 2, further comprising downloading over the internet and updating in-game advertising.

10. A method according to claim 9, wherein the in-game advertising includes in-game advertising updated on virtual clothing.

11. A method according to claim 2, wherein the reality television show does not including professional actors.

12. A video game machine comprising:
one or more processors;
video game machine memory;
a video game controller; and
a computer-readable game medium configured to provide a sports video game in conjunction with a video game machine, the sports video game having associated video game data comprising at least video game rules and one or more video game character parameters, the computer-readable game medium having instructions stored thereon, which when executed by said one or more processors, causes the video game machine to perform the steps of:
loading said video game data stored by the computer-readable game medium into video game machine memory for playing the sports video game, wherein the one or more video game character parameters define respective one or more video game characters, and wherein each of the one or more video game characters are associated with corresponding real-life reality television show participants;
loading data associated with a reality television show into the video game machine memory, the real-life reality show participants being participants in the reality television show; and
enabling a user to control the one or more video game characters during playing of the sports video game using the video game controller;
wherein, the reality television show is a martial arts reality television show where the real-life reality television show participants live together in a house during a real-life competition, the real-life competition progressing as the reality television show progresses; and
wherein, said data is periodically updated over the Internet as the martial arts reality show progresses through the real-life competition, thereby affecting at least the one or more character parameters.

13. A video game machine according to claim 12, wherein the reality television show is in a genre of television programming that presents purportedly unscripted dramatic or humorous situations, documents actual events, and does not include professional actors.

14. A method according to claim 12, wherein the video game machine includes a video game console.

* * * * *